June 28, 1932. N. J. POUX 1,864,614
SEPARABLE FASTENER
Filed Sept. 16, 1929  2 Sheets-Sheet 2
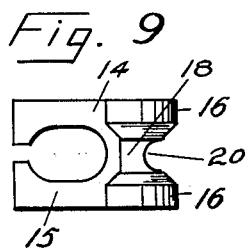
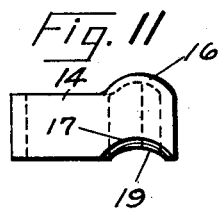
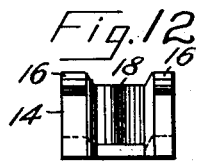
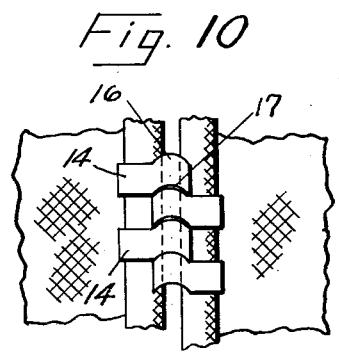
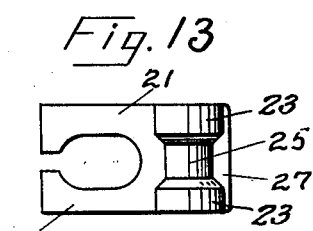
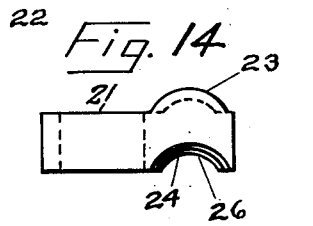
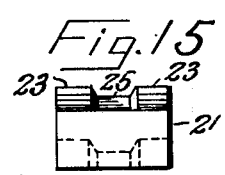
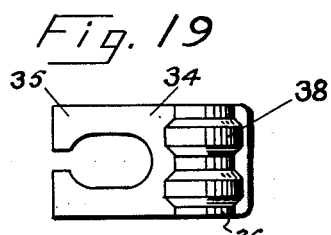
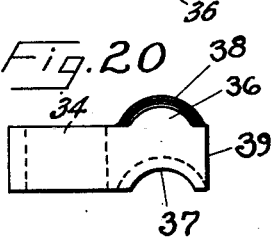
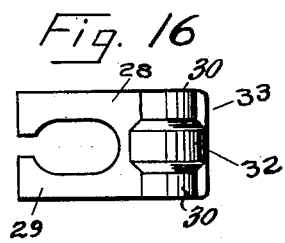
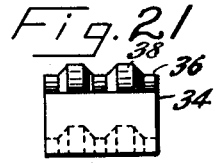
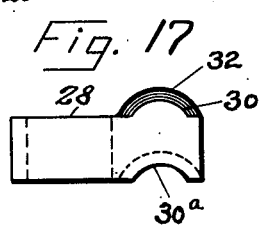
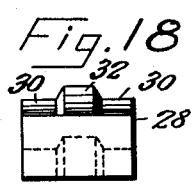
Noel J. Poux
INVENTOR
BY
ATTORNEY Patented June 28, 1932

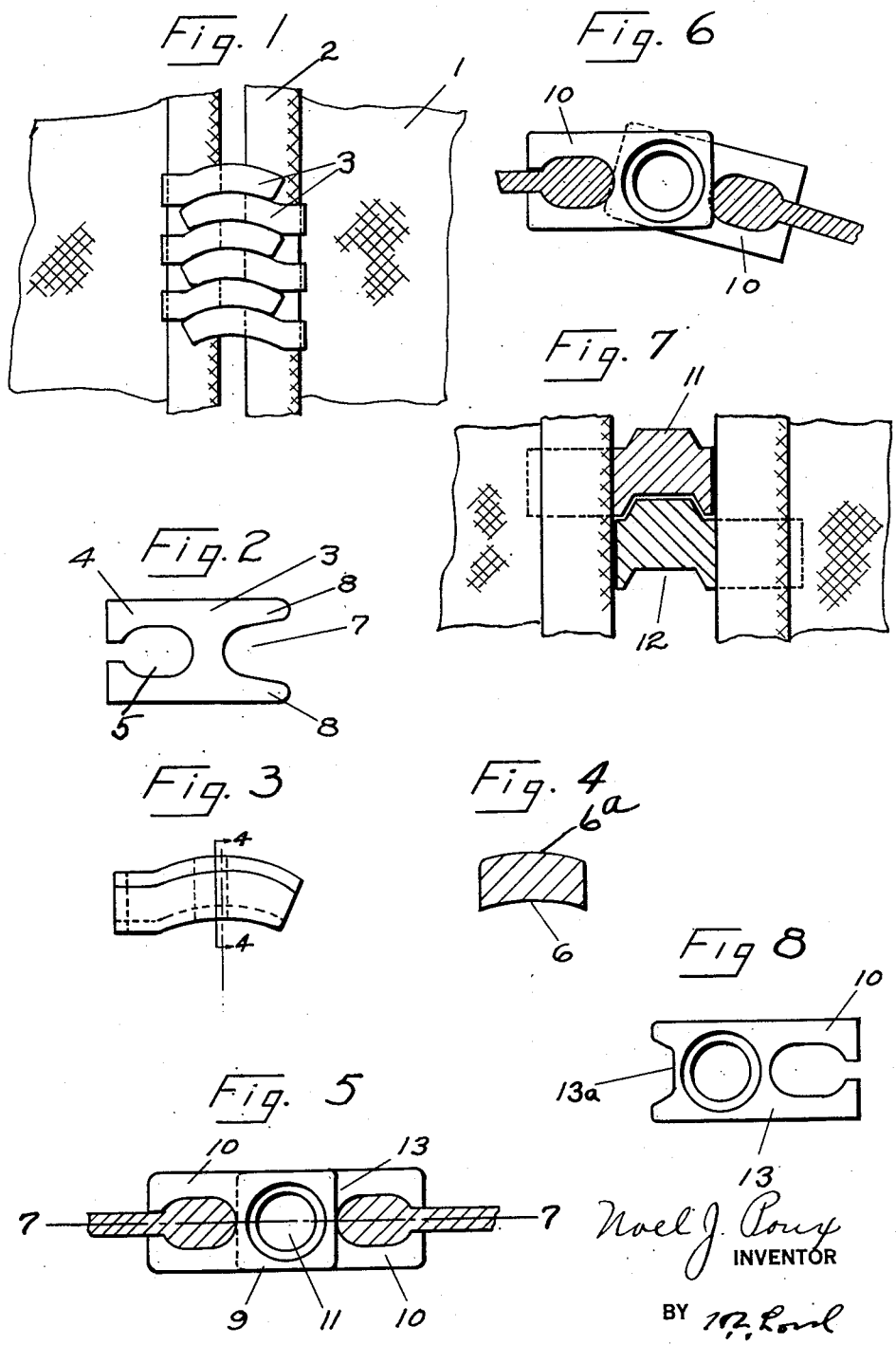

1,864,614

UNITED STATES PATENT OFFICE

NOEL J. POUX, OF MEADVILLE, PENNSYLVANIA, ASSIGNOR TO LION FASTENER INC., OF MEADVILLE, PENNSYLVANIA, A CORPORATION OF DELAWARE

SEPARABLE FASTENER

Application filed September 16, 1929. Serial No. 392,786.

Separable fasteners may be made with shapes of the interlocking members which are desirable so far as the operation, or closing and separating of the members is concerned under normal conditions, but which are not entirely satisfactory for the reason that when the stringers carrying the interlocking members are swung out of their common plane and into a position approaching parallelism the interlocking of the fasteners is rendered uncertain. One of the objects of the present invention is to prevent in a convenient and simple manner the swinging of the interlocking members an abnormal distance out of their common plane. In carrying forward this idea it is desirable to form the interlocking members of such shape that they may be more readily closed and separated in the normal operation of the device, thus utilizing the possibilities of variation in shape made possible by the locking against excessive turning of the members out of their normal plane. Features and details of the invention will appear from the specification and claims.

Preferred embodiments of the invention are illustrated in the accompanying drawings as follows:—

Fig. 1 shows a plan view of the fastener as arranged in an ordinary pair of stringers.

Fig. 2 a side elevation of a preferred form of interlocking member.

Fig. 3 a top view of the same.

Fig. 4 a section on the line 4—4 in Fig. 3.

Fig. 5 a side elevation of a modification.

Fig. 6 a view of the same structure slightly deflected.

Fig. 7 a section on the line 7—7 in Fig. 5.

Fig. 8 a further modification.

Fig. 9 a side elevation of an interlocking member of an alternative construction.

Fig. 10 a plan view of the same structure in position on stringers.

Fig. 11 a top view of one of the interlocking members shown in Fig. 9.

Fig. 12 an end view of the same.

Fig. 13 a side elevation of a locking member of an alternative construction.

Fig. 14 a top view of the member shown in Fig. 13.

Fig. 15 an end view of the member shown in Fig. 13.

Fig. 16 a side elevation of a locking member of a modified construction.

Fig. 17 a plan view of the structure shown in Fig. 16.

Fig. 18 an end view of the structure shown in Fig. 16.

Fig. 19 a side elevation of a locking member of an alternative construction.

Fig. 20 a top view of the member shown in Fig. 19.

Fig. 21 an end view of the member shown in Fig. 19.

1 marks the stringer, 2 a rib along the stringer, this being of ordinary construction, and 3 the interlocking members. These have jaws 4 enclosing a recess 5, the rib 2 being arranged in the recess and the jaws clamping these ribs to locate the fasteners in spaced relation along the stringers in the usual manner. The members 3 have the curved interlocking surfaces 6a and 6, the surfaces 6a being convex and the surfaces 6 being concave, the axial center of the curves of said surfaces being at right angles to the plane of the stringers, as indicated in Fig. 3 of the drawings and the interlocking surfaces being also curved with the axial centers of the curves lying in the plane of the stringers as shown in Fig. 4. In other words, the interlocking members are curved both crosswise and lengthwise of the fastening members. The curves of the locking surfaces having their axial centers in alinement with the stringers giving to the members their convex and concave form transversely of the members and tends to lock the fastener when closed against displacement by a movement of one stringer out of the plane of the other stringer. Each member is provided with a notch 7 into which the rib 2 of the opposing stringer extends, the rib being engaged by forks 8 and preventing the swinging of the fastener to a position bringing the stringers into approximately parallel position. The locking of this back-swinging of the fasteners makes it possible to use a shape of locking surfaces which more certainly move into and out of position in opening and closing the fastener and assure with greater certainty the maintenance of the lock of the fastener in use.

In Fig. 5 members 9 have jaws 10 for securing the fasteners on the stringer edges. The members are provided with projections 11 and corresponding cavities 12, the projections nesting in the cavities as the fastener is closed. The ends of the members extend into, or near enough engagement with the edges of the opposing stringers to prevent a complete swinging of the fasteners to bring one stringer back on the other, the abutting ends engaging the edge of the opposing stringer, as clearly illustrated in Fig. 6.

In Fig. 8 the member 13 is similar to that shown in Fig. 5 with the exception that the end 13a is forked to better assure the locking of the end of the member against the edge of the stringer.

In Figs. 9 to 12 members 14 are provided with jaws 15 for engaging the edges of the stringer. The locking surfaces 16 and 17 are convex and concave, the axis of these surfaces extending at right angles to the plane of the stringers, the convex surfaces nesting in the concave surfaces, as clearly shown in Fig. 10. The convex members are grooved at 18 and the concave members have ribs 19 seating in the grooves 18. The ends of the members are notched at 20 to better engage the edge of the opposing stringer. The locking surfaces of the members when in engaged position are slightly spaced apart, as clearly shown in Fig. 10, thus giving a limited freedom of movement. This facilitates the closing of the members. A similar spacing may be provided in the other members, such as specifically shown in Fig. 7.

In the structures shown in Figs. 13, 14 and 15 locking members 21 have clamping jaws 22 and are provided with convex locking surfaces 23 and concave surfaces 24, these surfaces coacting as the members are closed. The convex surfaces are grooved at 25 to receive ribs 26 and the ends of the members are extended at 27 to more surely engage the edge of the opposing stringer so as to lock excessive swinging of the members.

In the structure shown in Figs. 16 to 18, members 28 have clamping jaws 29. They are provided with convex locking surfaces 30 which operate in corresponding concave surfaces 30a, the convex surfaces having ribs 32 operating in similar corresponding grooves shown in dotted lines in the concave surfaces. Ends 33 are extended to engage the edge of an opposing stringer to prevent excessive swinging.

In Figs. 19 and 20 is shown an alternative construction in which members 34 are provided with the usual clamping jaws 35. These have the convex locking surfaces 36 nesting in the concave surfaces 37. The convex surfaces have a plurality of ribs 38 which extend into corresponding grooves shown in dotted lines. The ends 39 are adapted to engage the edge of an opposing stringer to prevent excessive swinging of the stringers.

What I claim as new is:—

1. A separable fastener comprising stringers, and interlocking members secured to the edges of the stringers, each of said members having a forked front edge engaging the edge of the opposing stringer to prevent the stringer from swinging out of the plane of said opposing stringer on an axis formed by the interlocking members.

2. A separable fastener comprising stringers, and interlocking members having curved interlocking surfaces secured to the edges of the stringers, convex on one side and concave on the other and the convex surface of one member nesting in the concave surface of the opposing member, the front edges of each member being forked and engaging the edge of the opposing stringer to prevent the stringer from swinging out of the plane of said opposing stringer on the interlocking surfaces as an axis.

3. A separable fastener comprising stringers, and interlocking members secured to the edges of the stringers, each member having curved interlocking surfaces, convex longitudinally and transversely of the member on one side and concave on the other, the convex surface of one member nesting in the concave surface of the opposing member, the front edges of each member being forked and engaging the edge of the opposing stringers to prevent the stringer from swinging out of the plane of the opposing stringer with the curved interlocking surfaces as an axis.

In testimony whereof I have hereunto set my hand.

NOEL J. POUX.